(12) United States Patent
Lee et al.

(10) Patent No.: US 7,556,734 B2
(45) Date of Patent: Jul. 7, 2009

(54) LIQUID/LIQUID EXCHANGE COLUMN

(75) Inventors: Adam T. Lee, Dallas, TX (US);
Kuang-Yeu Wu, Plano, TX (US); Larry W. Burton, Desoto, TX (US); Francis W. Lemon, Ottawa (CA)

(73) Assignee: Amt International, Inc., Richardson, TX (US)

( * ) Notice: Subject to any disclaimer, the term of this patent is extended or adjusted under 35 U.S.C. 154(b) by 225 days.

(21) Appl. No.: 11/048,812

(22) Filed: Feb. 3, 2005

(65) Prior Publication Data
US 2006/0169573 A1 Aug. 3, 2006

(51) Int. Cl.
*B01D 11/04* (2006.01)
(52) U.S. Cl. .............. 210/247; 210/511; 210/634; 422/256; 208/317; 196/14.52

(58) Field of Classification Search .............. 210/247, 210/511, 634; 422/256; 261/113; 208/317; 196/14.52
See application file for complete search history.

(56) References Cited

U.S. PATENT DOCUMENTS 2,752,229 A * 6/1956 Brown et al. .............. 422/256

* cited by examiner

*Primary Examiner*—David A Reifsnyder
(74) *Attorney, Agent, or Firm*—Ridout & Maybee LLP

(57) ABSTRACT

The contact between, for example, ascending liquid droplets of lighter liquid, as the dispersed phase, and heavier liquid, as the continuous phase, flowing across perforated trays in a flooded liquid/liquid contacting column, is enhanced by providing upstanding baffles on lower trays, interspersed with depending baffles from the trays above. The baffles cause the heavy liquid to flow along an undulating path. Flow distributing partitions extend along the undulating flow path, between the baffles, to distribute liquid flow across the trays. The roles of the lighter liquid and the heavier liquid may be reversed as phases.

7 Claims, 4 Drawing Sheets

LIQUID/LIQUID EXCHANGE COLUMN

FIELD OF THE INVENTION

This invention relates to a liquid/liquid exchange column.

Liquid/liquid exchange columns are know in which, for example, a liquid, having a relatively greater density, hereinafter referred to in this patent specification and claims, as the "relatively denser, heavier liquid" or "heavier liquid," is passed downwardly in an upwardly extending casing, and across a series of upwardly spaced, perforated trays therein, as a liquid layer, ie., a continuous phase, while a relatively less dense liquid forming a dispersed phase, hereinafter referred to in this patent specification and claims as the "relatively less dense, lighter liquid" or "lighter liquid," has sufficient buoyancy to form, a supernatant layer on the heavier liquid from droplets of the lighter liquid by ascending through the tray perforations and the layers of the heavier liquid. The perforated trays have drainage openings so that the descending heavier liquid will flow back and forth consecutively across the perforated trays. The drainage openings are provided with downcomers forming overflow weirs for providing the layer of heavier liquid on the trays, for the droplets of the lighter liquid to ascend through, and liquid seals between the trays to trap the lighter liquid beneath the perforated trays.

In other liquid/liquid exchange columns the heavier liquid is the dispersed phase and the lighter liquid is the continuous phase. In these exchange columns, the heavier liquid gravitates from a continuous layer, downwardly through the pores of the trays to form droplets which gravitate further downwardly through a supernatant layer of the lighter liquid flowing between the undersides of the porous trays and the layers of the heavier liquid therebelow. It follows, from the above descriptions of the roles of the heavier and lighter liquids, that the heavier liquid is capable of gravitating downwardly as droplets through a continuous phase layer of the lighter liquid flowing across the undersides of the perforated trays.

While known liquid/liquid exchange columns are useful, it would be highly desirable to increase the exchange between the liquids by increasing the surface contact between the dispersed phase and the continuous phase, and enhancing scrubbing of the dispersed phase by the continuous phase.

SUMMARY OF THE INVENTION

According to the present invention there is provided a liquid/liquid exchange column, comprising, a) an upwardly extending exchange column casing for flooding by the reception of a relatively denser, heavier one of the liquids at, and removal of a relatively less dense, lighter one of the liquids from, an upper end, and the reception of the lighter liquid at, and the removal of, heavier liquid from, a lower end, b) a series of perforated trays partitioning the casing at different levels in the column, with adjacent trays provided with liquid openings which are positioned for a first one of the said liquids to cross first sides the trays, as a continuous phase, while a second one of the said liquids permeates the trays from a second side to form globules, as a dispersed phase in the first liquid, c) for each liquid opening, a duct comprising,
  i) a liquid retaining portion, for retaining a layer of first liquid in contact with the first side of the tray containing that liquid opening, and
  ii) a liquid conveying portion extending in the opposite direction to the liquid for retaining a layer of the second liquid in contact with the second side of the tray containing that liquid opening, the liquid conveying portion having a flow restricting outlet therefrom, for conveying first liquid to the first side of an adjacent tray, while retaining a liquid seal of the first liquid therein, and for each pair of adjacent trays, d) at least one depending baffle from the upper one of those trays, and e) at least one upstanding baffle on the lower one of those trays, and wherein, f) each depending baffle, upstanding baffle, liquid retaining portion, and liquid conveying portion extending between adjacent trays, overlap vertically, and are spaced from one another, to provide, an undulating, first liquid flow paths between those adjacent trays.

The liquid retaining portions may be upstanding on each tray and the liquid conveying portions extend downwardly from the trays, so that the first liquid is the heavier liquid.

The liquid retaining portions may depend from the trays, and the liquid conveying portions extend upwardly from the trays, so that the first liquid is the lighter liquid.

Flow directing partitions may be provided which partition the spaces between the depending and upstanding baffles to form a grid therewith and distribute liquid flow across the trays.

The liquid conveying portions, when extending downwardly from the trays, may have sloping lower wall portions to gradually reduce the cross-sectional area in a downward direction.

The liquid conveying portions, when extending upwardly from the trays, may have sloping upper wall portion to deflect descending globules towards the tray immediately therebelow.

The flow restricting outlets may comprise horizontal slots which form a grill.

BRIEF DESCRIPTION OF THE DRAWINGS

In the accompanying drawings which illustrate, by way of example, embodiments of the present invention.

DETAILED DESCRIPTION OF THE PREFERRED EMBODIMENTS

Figure 1:
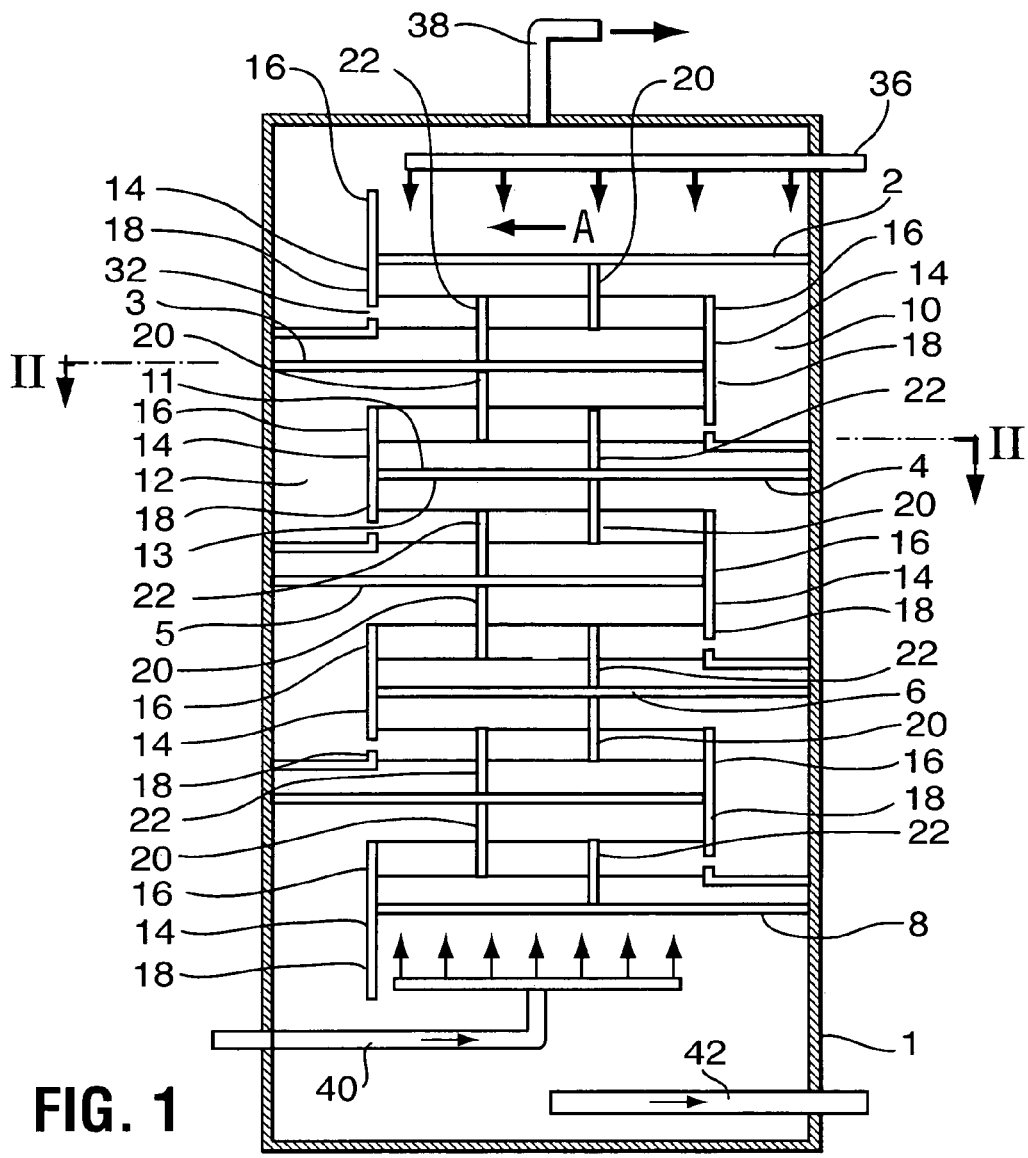
FIG. 1 is a schematic side view of a liquid/liquid exchange column.
Figure 2:
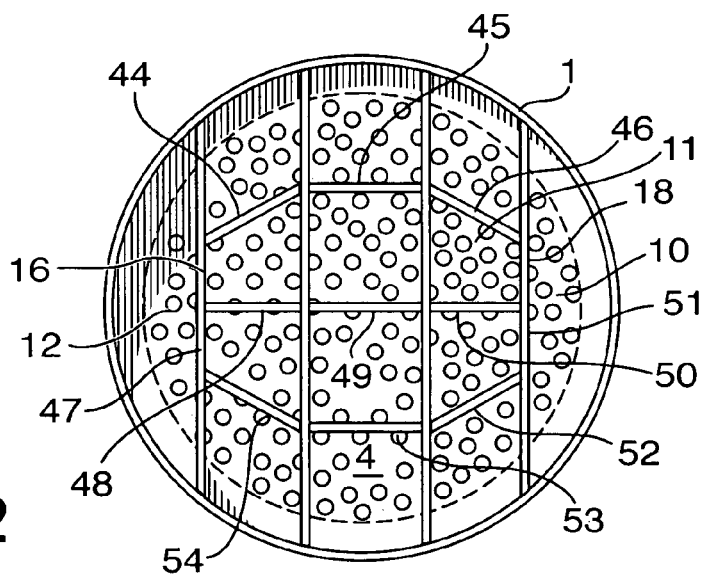
FIG. 2 is a schematic plan view along II-II, FIG. 1.
Figure 3:
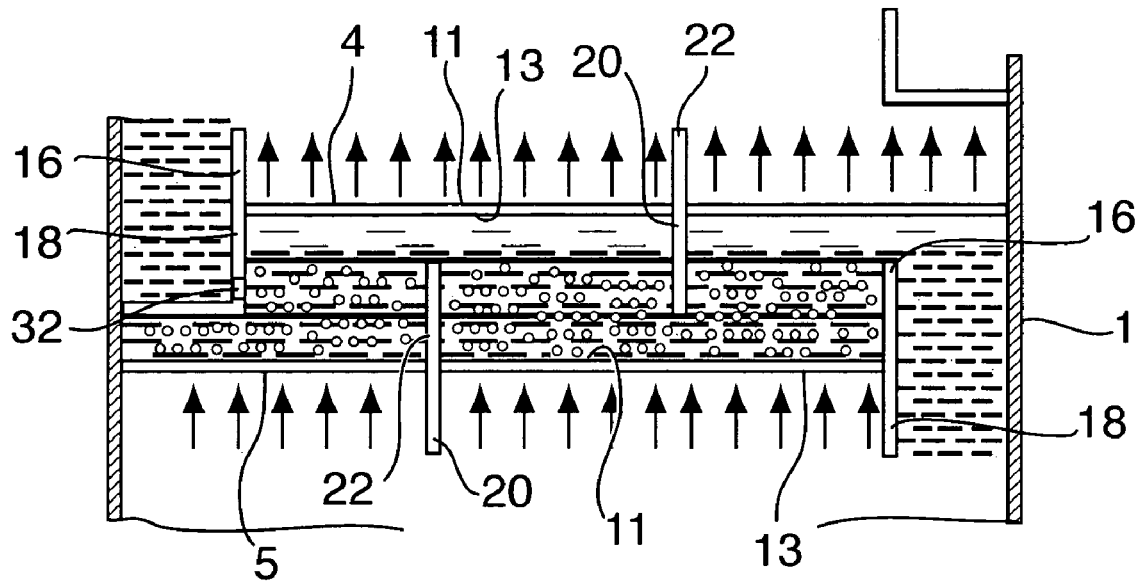
FIG. 3 is a schematic side view of a portion of the column shown in FIG. 1.

In FIGS. 1 to 3, there is shown a liquid/liquid exchange column, comprising a) an upwardly extending exchange column casing 1, for flooding by the reception of a relatively denser, heavier one of the liquids at, and the removal of a relatively less dense, lighter one of the liquids from, an upper end, and the reception of the lighter liquid at, and the removal of, the heavier liquid from, a lower end, b) a series of perforated trays 2 to 8 partitioning the casing 1 at different levels, with adjacent trays, such as trays 3 and 4, provided with liquid openings 10 and 12 which are positioned for a first one of said liquids to cross first sides 11 of the trays 2 to 8, between the liquid openings 10 and 12 as a continuous phase, while a second one of the said liquids permeates the trays 2 to 3 from a second side 13 to form globules, as a dispersed phase in the first liquid, c) for each liquid opening, such an opening 10, a duct 14 comprising,
   i) a liquid retaining portion 16, for retaining a layer of first liquid in contact with the first side 11 of the tray 2 to 8 containing that liquid opening 10, and
   ii) a liquid conveying portion 18 extending in the opposite direction to the liquid retaining portion 16 for retaining a layer of the second liquid in contact with the second side 13 of the tray 2 to 8 containing that opening 10, the liquid conveying portion 18 having a flow restricting outlet 32 therefrom, for conveying first liquid to the first side 11 of an adjacent tray, such as trays 10 and 12, while retaining a liquid seal of the first liquid therein, and for each pair of adjacent trays 2 to 8, d) at least one depending baffle 20 from the upper one of those trays, such as tray 3, and e) at least one upstanding baffle 22 on the lower one of those trays, such as tray 4, and wherein, f) each depending baffle 20, the upstanding baffle 22, and the liquid retaining portion 16, and liquid conveying portion 18 extending between trays, such as trays 3 and 4, overlap vertically, and are spaced from one another, to provide, an undulating first liquid flow paths across each of the trays 2 to 8 for the first liquid.

The liquid retaining portions 16 may be upstanding on each tray 2 to 8, as shown in FIGS. 1 to 3, and the liquid conveying portions 18 extend downwardly from the trays 2 to 7, with the outlets 32 adjacent the lower tray, so that the first liquid will flow downwardly therein and is the heavier liquid.

Figure 4:
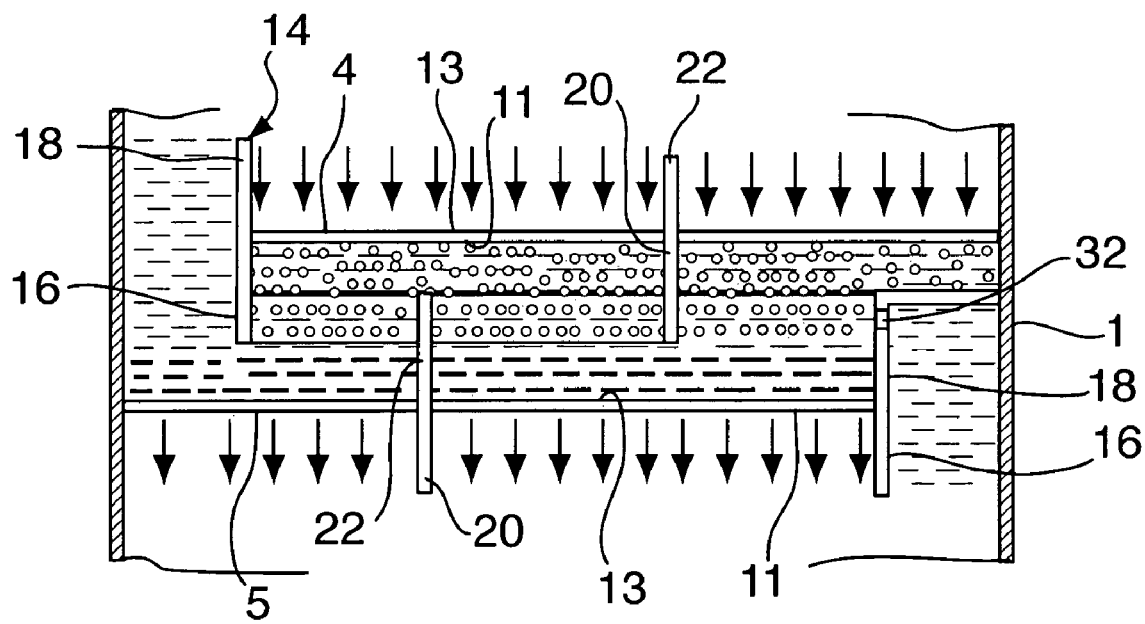
FIG. 4, is a schematic side view of a portion of a different column to that shown in FIGS. 1 to 3.

The liquid retaining portions 16 may depend from the trays 2 to 8, as shown in FIG. 4, and the liquid conveying portions 18 extending upwardly on the trays 2 to 7, with the outlets 32 adjacent the upper tray, so that the first liquid will flow upwardly therein and is the lighter liquid.

Referring now to FIGS. 1 to 3, a heavier liquid inlet 36, and a lighter liquid outlet 38, are provided at the upper end of the casing 1, with the lighter liquid outlet 38 at a higher level than the heavier liquid inlet 36. A lighter liquid inlet 40, and a heavier liquid outlet 42, are provided at the lower end of the casing 1, with the lighter liquid inlet 40 at a higher level than the heavier liquid outlet 42.

In the operation of this embodiment, the casing 1 is flooded by
   i) heavier liquid from the inlet 36 so that heavier liquid gravitates down the casing from tray 2 through the openings 14, by flowing as a layer across each of the trays 3 to 8, in contact with their first sides 11, as the continuous phase, to exit from the casing 1 through outlet 42, and
   ii) lighter liquid, as the second, dispersed phase liquid, entering the inlet 40 passes upwardly, to form a layer of second liquid in contact with the second sides 13 of the tray 2 to 8 and then passes through the pores in the trays 2 to 8 and to form ascending globules in the layer heavier liquid flowing across the first sides of the trays 2 to 8.

The globules are buoyed upwardly through the layer of heavier liquid on the trays 2 to 8 to form what is essentially a floating, supernatant layer of lighter liquid adjacent the second sides of the trays 2 to 7, and then pass upwardly through the pores of the next tray 2 to 7 to form the globules once more.

In this embodiment, there is a layer essentially of lighter liquid immediately beneath each tray 2 to 8, and a layer of essentially heavier liquid on each tray 2 to 8 which overflows over the outlets 32 and any lighter liquid that may be entrained in the overflow of liquid over the portions 16 is bourne upwardly from a liquid seal of heavier liquid that collects in the downwardly extending passage portions 18 to join the essentially lighter liquid layer beneath the trays 1 to 7.

The heavier liquid that collects in the downwardly extending passage portions 18, forms a liquid seal therein, and is allowed to flow out of the downwardly extending passages 18, at a position adjacent the first side 11 of the tray below, at a rate which maintains the liquid seal.

The heavier liquid flowing out of the downwardly extending passages 18 flows across the trays 3 to 9 and entraining the globules of the lighter liquid, which are bourne upwardly therein, is deflected by the baffles 20 and 22 to flow along an undulating path and this causes the heavier liquid to retain the globules of lighter liquid for a longer period, and also to scrub them to a greater extent, thus enhancing exchange between the heavier liquid and the lighter liquid.

As is more clearly shown in FIG. 3, the descending heavier liquid flows over the retaining portion 16 of the duct 14 and down the liquid conveying portion 18 to exit therefrom through the outlet 32 and flow along the undulating path, over the tray 5 to the next retaining portion 16. The liquid seal in the liquid conveying portion 18 isolates the lighter liquid from the tray 4 passing to the tray 5, and so the only way of escape for this lighter liquid is upwardly through the perforations in the tray 4 and to form globules once more on that tray.

Referring to FIG. 4, in this embodiment each duct 14 extends to convey liquid upwardly i.e., the liquid conveying portion 18 extends upwardly to discharge liquid through the outlet 32 adjacent the tray 2 to 7 above, while the liquid retaining portion 16 extends downwardly to retain a layer of liquid immediately beneath each tray 2 to 7.

In this embodiment a layer essentially of heavier liquid on each tray 2 to 8 descends through the pores of the trays 2 to 8, to pass downwardly as globules through a supernatant layer of lighter liquid flowing across and immediately beneath each tray 2 to 7. A layer of lighter liquid is retained under each tray 2 to 8 by the liquid retaining portion 16 while excess lighter liquid escapes under the liquid retaining portion 16 to float upwardly through the liquid conveying portion 18 and exit through the outlet 32 to form a layer of essentially lighter liquid beneath the next tray 2 to 7 thereabove.

Thus, in this embodiment, the lighter liquid is the continuous phase and the heavier liquid is the dispersed phase.

In some embodiments of the present invention, flow directing partitions 44 to 54 may be provided partitioning the spaces between the depending baffles 20 and the upstanding baffles 22 to form a grid therewith and distribute liquid flow across the trays 3 to 8.

Figure 5:
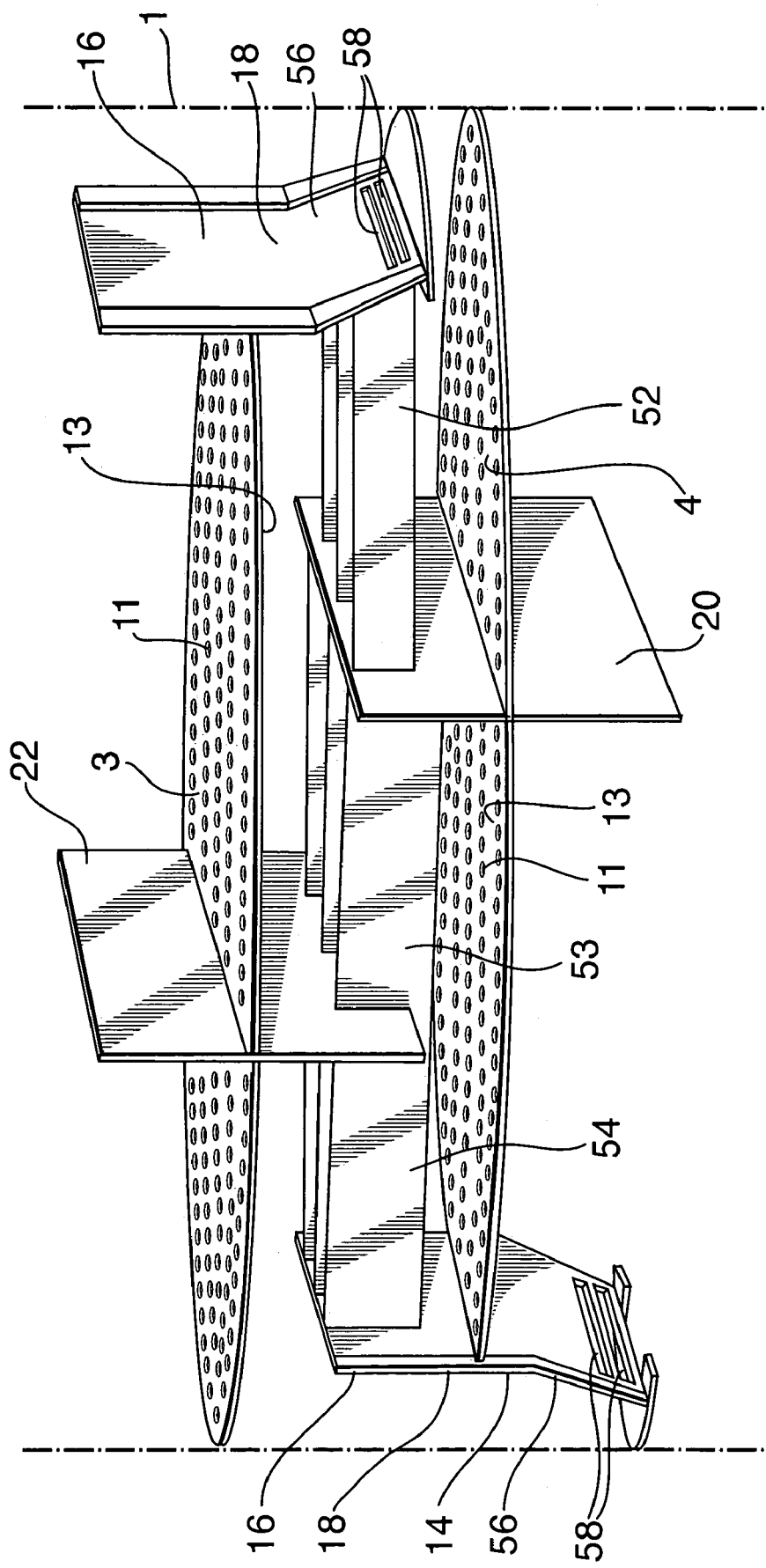
FIG. 5 is a perspective view of a portion of a different column to that shown in FIGS. 1 to 3.
Figure 6:
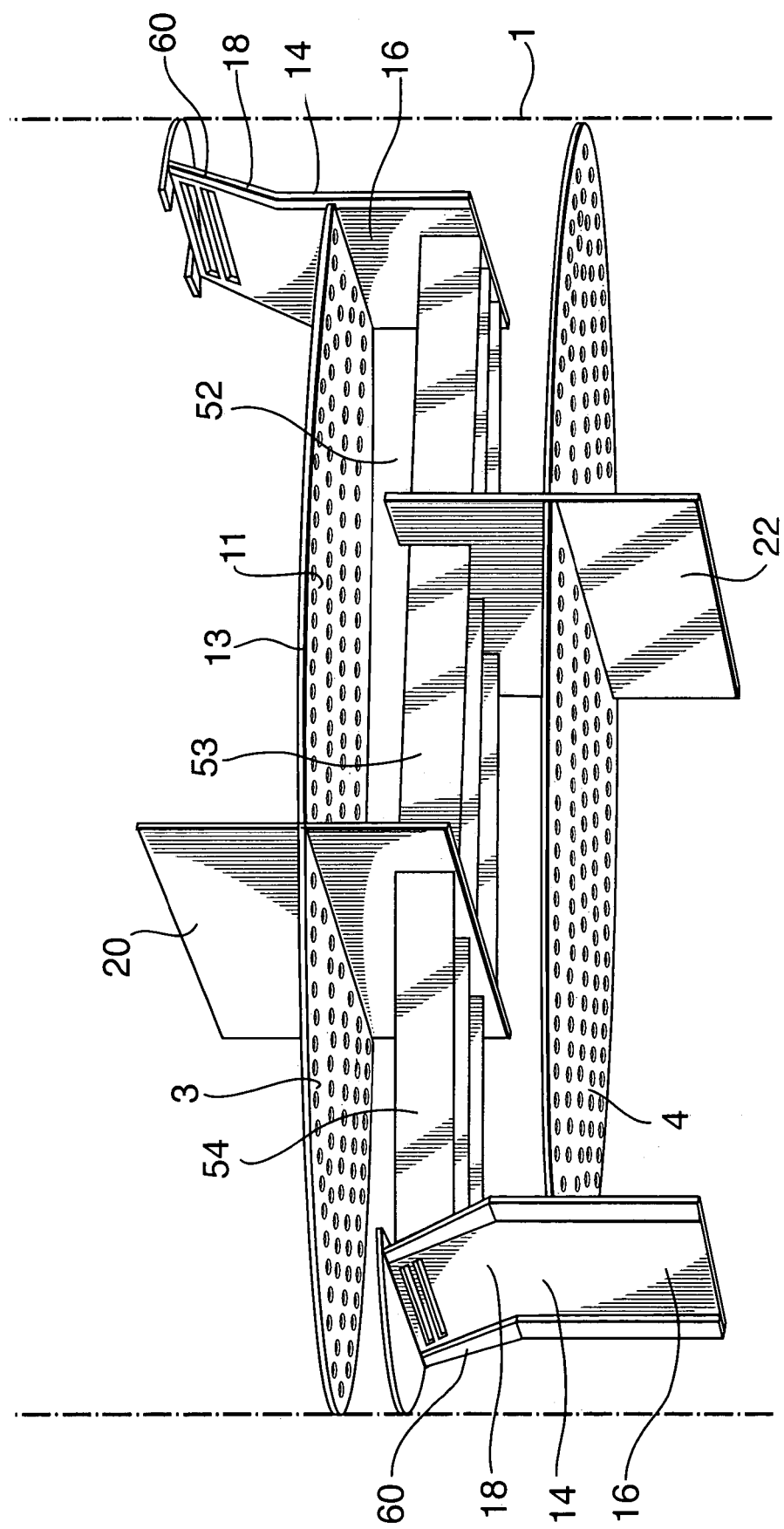
FIG. 6 is a similar view to FIG. 5, but of a different column thereto.

In FIGS. 5 and 6, similar parts to those shown in FIGS. 1 to 3 are designated by the same reference numerals, and the previous description is relied upon to describe them.

In FIG. 5, the liquid conveying portion 18 has a sloping, lower wall portion 56 to gradually reduce the cross-sectional area therein, in a downwardly extending direction to contain a seal of the heavier liquid, and the outlet 32, FIGS. 1 to 3, is replaced by horizontal slots 58 forming a grill.

The embodiment shown in FIG. 5 operates in the same manner as the embodiment described with reference to FIGS. 1 to 3.

In FIG. 6, the conveying portion is uppermost, and has a sloping, upper wall portion 60 to deflect descending globules of heavier liquid towards the tray 3 to 8 immediately therebelow, and contain a seal of the lighter liquid, the outlet 32, FIG. 4, is replaced by horizontally extending slots 62 to form a grill.

The embodiment shown in FIG. 6 operates in the same manner as the embodiment described with reference to FIG. 4.

Exchange columns of the present invention are useful in, for example, the petroleum refining and petrochemical industries.

While reference has been made to essentially lighter liquid and heavier liquid layers, it will be appreciated that a transitional layer exists between these layers compose of both liquids.

It will also be appreciated that the baffles, liquid retaining portions, and liquid retaining portions may be inclined vertically or curved and still provide undulating, first liquid flow paths.

We claim:

1. A liquid/liquid exchange column, comprising,
   a) an upwardly extending exchange column casing for flooding by the reception of a relatively denser, heavier one of the liquids at, and removal of a relatively less dense, lighter one of the liquids from, an upper end, and the reception of the lighter liquid at, and the removal of the heavier liquid from, a lower end,
   b) a series of perforated trays partitioning the casing at different levels in the column, with adjacent trays provided with liquid openings which are positioned for a first one of said liquids to cross first sides of the trays, as a continuous phase, while a second one of said liquids permeates the trays from a second side to form globules, as a dispersed phase in the first liquid,
   c) for each liquid opening, a duct comprising,
      i) a liquid retaining portion, for retaining a layer of first liquid in contact with the first side of the tray containing that liquid opening, and
      ii) a liquid conveying portion extending in the opposite direction to the liquid for retaining a layer of the second liquid in contact with the second side of the tray containing that liquid opening, the liquid conveying portion having a flow restricting outlet therefrom, for conveying first liquid to the first side of an adjacent tray, white retaining a liquid seal of the first liquid therein, and for each pair of adjacent trays,
   d) at least one depending baffle depending downwardly from each of said trays, and
   e) at least one upstanding baffle extending upwardly on each of said trays, and wherein, each depending baffle, upstanding baffle, and liquid retaining portion, and liquid conveying portion extending between adjacent trays, overlap vertically, and are spaced from one another, to provide, together with the duct, an undulating, first liquid flow paths between those adjacent trays.

2. An exchange column according to claim 1, wherein the liquid retaining portions are upstanding on each tray and the liquid conveying portions extend downwardly from the trays, so that the first liquid is the heavier liquid.

3. An exchange column according to claim 1, wherein the liquid retaining portions depend from the trays, and the liquid conveying portions extend upwardly from the trays, so that the first liquid is the lighter liquid.

4. An exchange column according to claim 3, wherein the liquid conveying portions have sloping upper wall portions to deflect descending globules towards the tray immediately therebelow.

5. An exchange column according to claim 1, further comprising flow directing partitions which partition the spaces between the depending and upstanding baffles to form a grid therewith and distribute liquid flow across the trays.

6. An exchange column according to claim 1, wherein the flow restricting outlets comprise horizontal slots which form a grill.

7. An exchange column according to claim 1 wherein said liquid opening of each tray is positioned for said first one of said liquids to cross said each tray in a direction opposite to the direction that said first one of said liquids crosses the trays adjacent thereto.

* * * * *